United States Patent
Norman

(10) Patent No.: US 11,279,086 B2
(45) Date of Patent: Mar. 22, 2022

(54) SOFT RECOATER BLADE AND METHOD OF DETECTING WEAR

(71) Applicant: Hamilton Sundstrand Corporation, Charlotte, NC (US)

(72) Inventor: Joshua M. Norman, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 146 days.

(21) Appl. No.: 16/512,101

(22) Filed: Jul. 15, 2019

(65) Prior Publication Data

US 2021/0016504 A1    Jan. 21, 2021

(51) Int. Cl.
| | |
|---|---|
| *B29C 64/214* | (2017.01) |
| *B29C 64/314* | (2017.01) |
| *B29C 64/255* | (2017.01) |
| *B33Y 30/00* | (2015.01) |
| *B33Y 40/00* | (2020.01) |
| *B29C 64/153* | (2017.01) |

(52) U.S. Cl.
CPC ........ *B29C 64/214* (2017.08); *B29C 64/255* (2017.08); *B29C 64/314* (2017.08); *B29C 64/153* (2017.08); *B33Y 30/00* (2014.12); *B33Y 40/00* (2014.12)

(58) Field of Classification Search
CPC ... B29C 64/214; B29C 64/314; B29C 64/255; B29C 64/153
See application file for complete search history.

(56) References Cited

U.S. PATENT DOCUMENTS

| | | | |
|---|---|---|---|
| 2002/0125875 | A1 | 9/2002 | Kelly et al. |
| 2018/0356350 | A1 | 12/2018 | Crear et al. |
| 2019/0381722 | A1* | 12/2019 | Wang ............ B29C 64/194 |

FOREIGN PATENT DOCUMENTS

| | | | |
|---|---|---|---|
| CN | 109648078 A | 4/2019 | |
| WO | 2015103476 A1 | 7/2015 | |
| WO | WO-2015103476 A1 * | 7/2015 | ............ B33Y 50/02 |

OTHER PUBLICATIONS

Extended European search report issued in corresponding EP application No. 19213440.1, dated Jun. 24, 2020.

* cited by examiner

*Primary Examiner* — Joseph S Del Sole
*Assistant Examiner* — Jamel M Nelson
(74) *Attorney, Agent, or Firm* — Locke Lord LLP; Scott D. Wofsy; Georgi Korobanov

(57) ABSTRACT

A system including a powder bed recoater blade, defining a longitudinal axis, for spreading powder of a powder bed including at least one wire interior thereof.

11 Claims, 2 Drawing Sheets

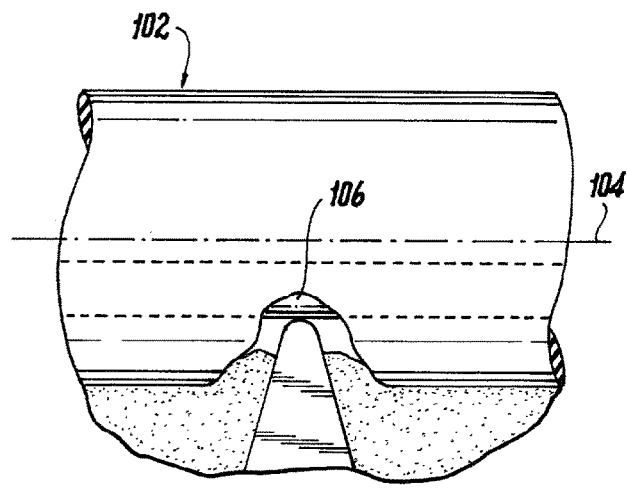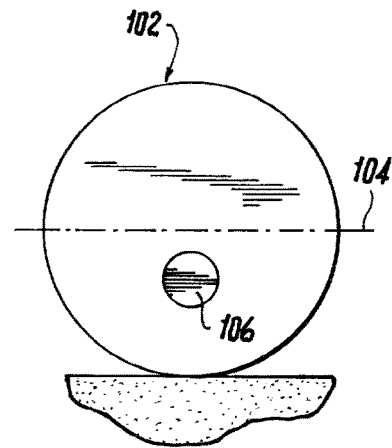
Fig. 2A  Fig. 2B
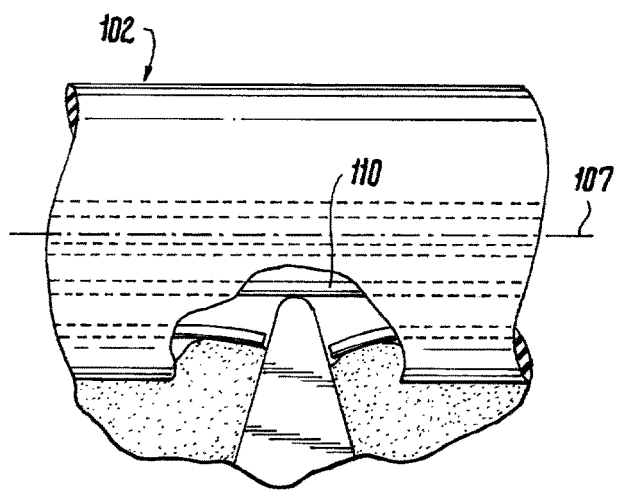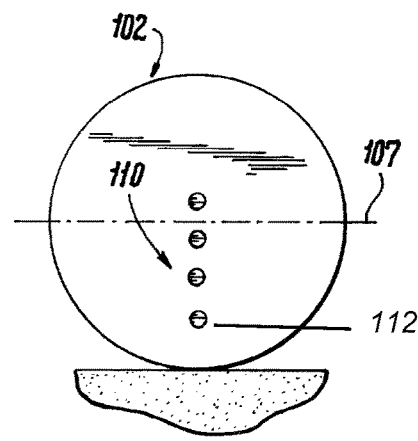
Fig. 3A  Fig. 3B

SOFT RECOATER BLADE AND METHOD OF DETECTING WEAR

BACKGROUND

Technological Field

The present disclosure relates to powder bed recoaters, and more particularly to a powder bed recoater monitoring system.

Description of Related Art 3D printing using powder beds and laser requires a method of spreading and smoothing the powder throughout the process in order to ensure smooth and level surface. One such recoating method uses a flexible blade material to physically spread the powder. A flexible blade is more forgiving for consolidated material which may protrude slightly above the recoating plane. However, the flexible blade material is susceptible to wear and can become detached, thus altering the bottom profile of the blade and top profile of the powder bed.

The conventional methods and systems of monitoring blade wear have generally been considered satisfactory for their intended purpose. However, there is still a need in the art for a monitoring system having improved reliability. There also remains a need in the art for such system and components that are economically viable. The present disclosure may provide a solution for at least one of these remaining challenges.

SUMMARY OF THE INVENTION

A system includes a powder bed recoater blade, defining a longitudinal axis, for spreading powder of a powder bed including at least one wire interior thereof, and a powder bed below the recoater blade containing a powdered material. The wire can be connected to a controller for notifying of blade damage, configured to signal when the wire is contacted or when when the wire is damaged.

The at least one wire can include a series of parallel wires spaced apart in the vertical direction. The wire or wires can include a conductive material. A single wire is between 1 mm and 2 mm each of the wires in a multi-wire system is between 0.1 mm and 2 mm.

The wire can extend parallel to the longitudinal axis, and be off center within the blade, located thin the bottom half of the blade.

A method includes driving an a powder bed recoater blade over a powder bed such that an interior wire is exposed and contacts powder bed material or a production part, and notifying the user that the interior wire is exposed or damaged and removing the recoater blade as a result of the notification.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 2a is a front view of the 3D printing blade of FIG. 1, showing the interaction of the blade and the object being printed;

FIG. 2b is a side view of the blade of FIG. 2a, showing the inner portion of the blade;

FIG. 3a is a front view of a second 3D printing blade of FIG. 1, showing the interaction of the blade and the object being printed; and FIG. 3b is a side view of the blade of FIG. 3a, showing the inner portion of the blade; and

DETAILED DESCRIPTION

Figure 1:
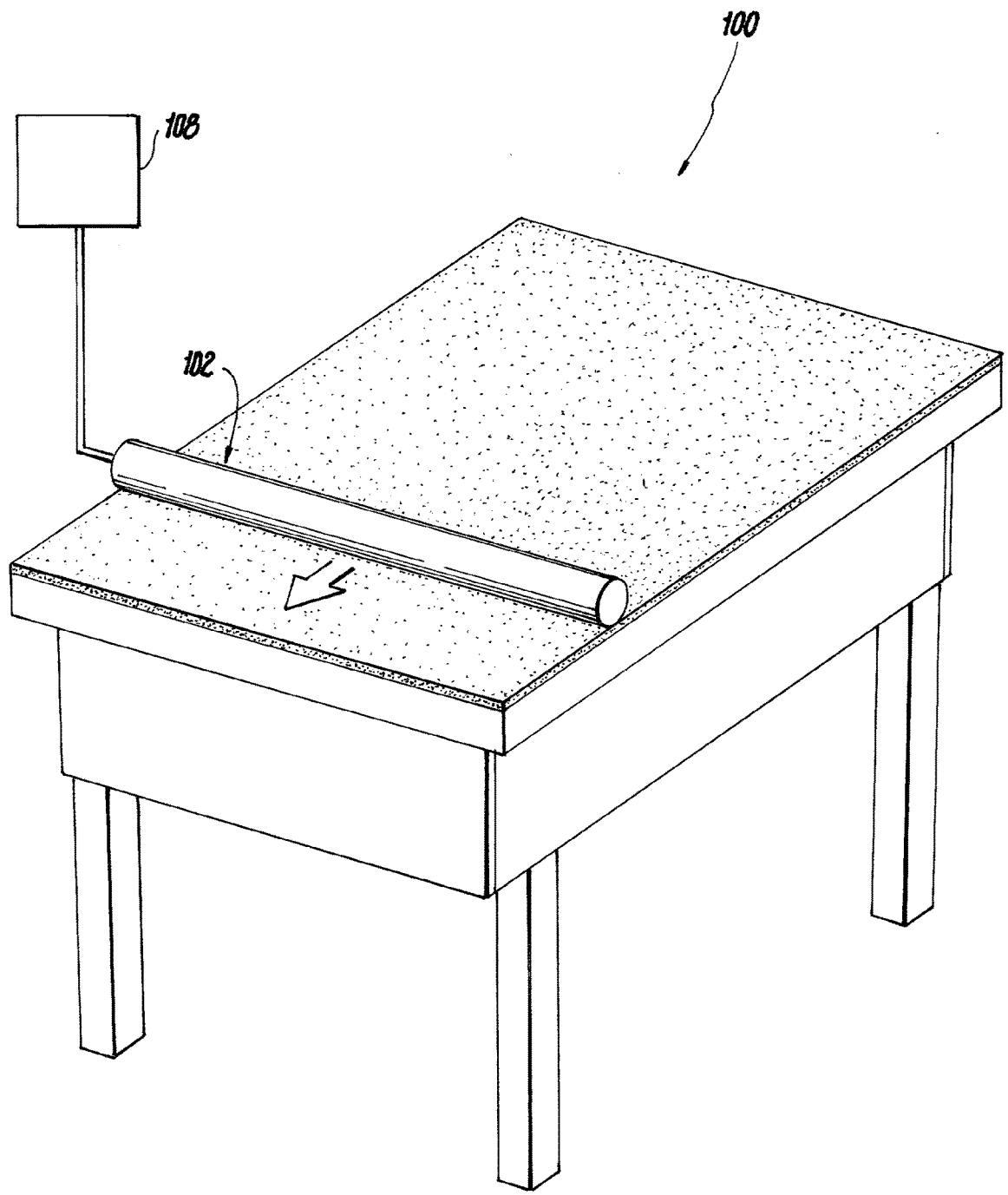
FIG. 1 is a perspective view of a 3D printing system using a powder bed.

Reference will now be made to the drawings wherein like reference numerals identify similar structural features or aspects of the subject invention. For purposes of explanation and illustration, and not limitation, a partial view of an exemplary embodiment of a recoater system in accordance with the invention is shown in FIG. 1 and is designated generally by reference character 100. Other embodiments of the recoater system in accordance with the invention, or aspects thereof, are provided in FIGS. 2a-3b, as will be described. The methods and systems of the invention can be used to detect when the recoater blade has been damaged and can be replaced before performance degrades.

FIG. 1 shows a powder bed system 100 for 3D printing using a soft recoater blade 102 connected to a controller 108 for notifying of blade damage. A soft recoater blade is typically made from silicon or rubber and spreads powder from one side of the build platform to the other. Because of its flexibility, the soft recoater blade can give way slightly in case of a collision with any metal parts being built. However, even small collisions happening repeatedly over many layers can cause the blade to become damaged.

FIGS. 2a and 2b show the recoater blade 102, defining a longitudinal axis 104 and a wire 106 on the interior of the blade 102. The wire 106, running parallel to the longitudinal axis 104. The wire 106 includes conductive material such that it can send a signal to the controller 108 when a desired condition is met. The wire 106 should between 1 mm and 2 mm. The wire 106 is located within the bottom half of the wire, or close enough to the surface of the blade, such that a user is notified early into the damage to the blade.

FIG. 3, shows a system including a series of parallel wires 110, with the lowest of the wires 112, being below the centerline of the blade 107. The spacing between each of the wires is greater than the thickness of each of the wires 110. The wires are between 0.1 mm and 2 mm.

A method of detecting damage to a powder bed recoater blade is also disclosed. The method includes driving a powder bed recoater blade over a powder bed and in turn contacting a partially protruding part from the powder bed. After the recoater blade contacts the partially protruding part, thereby damaging the blade and exposing the wire within, the wire then contacts the protruding part creating a closed circuit and notifying the user that the blade has been critically damaged.

It is also conceived that multiple wires are embedded within the blade, and when the recoater blade contacts the partially protruding part in such a way that the blade is damaged, the part severs one or more of the wires, thereby opening a circuit. A notification is sent if the wire is simply contacted and a short is caused, or the notification is sent if the at least one wire is damaged and an electrical open loop is created. The series of wires allows a user to track the progression of the damage. If a first wire is severed, the performance of the blade can still be acceptable, and the user is simply put on alert. Once a second or third wire is contacted or damaged, an alert can be sent to the user notifying them that the blade is critically damaged and needs to removed and replaced.

The methods and systems of the present disclosure, as described above and shown in the drawings, provide for a system and method of detecting damage to a powder bed recoater blade with superior properties including increased reliability and decreased complexity, and/or cost. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A system comprising:
 a powder bed recoater blade, defining a longitudinal axis, for spreading powder of a powder bed including at least one wire interior thereof, wherein the wire extends parallel to the longitudinal axis, wherein the wire is off center within the blade, and wherein the wire is within the bottom half of the blade.

2. The system of claim 1, wherein the wire is connected to a controller for notifying of blade geometry changes.

3. The system of claim 2, wherein the controller is configured to signal when the wire is contacted.

4. The system of claim 2, wherein the controller is configured to signal when physical characteristics of the wire have changed.

5. The system of claim 1, further comprising a powder bed below the recoater blade containing a powdered material.

6. The system of claim 1, wherein the at least one wire includes a series of parallel wires.

7. The system of claim 6, wherein the at least one wire includes a series of parallel wires spaced apart in the vertical direction.

8. The system of claim 1, wherein the wire includes a conductive material.

9. The system of claim 1, wherein the wire is between 1 mm and 2 mm, inclusive.

10. The system of claim 6, wherein each of the wires is between 0.1 mm and 2 mm, inclusive.

11. The system of claim 1, wherein the recoater blade is part a system for an additive manufacturing.

* * * * *